US006203638B1

(12) United States Patent
Uram

(10) Patent No.: US 6,203,638 B1
(45) Date of Patent: Mar. 20, 2001

(54) METHOD OF MAKING INJECTION MOLDED CERAMIC CUP

(75) Inventor: Stuart Z. Uram, Alpine, NJ (US)

(73) Assignee: Certech, Inc., Wilkes-Barre, PA (US)

( * ) Notice: Subject to any disclaimer, the term of this patent is extended or adjusted under 35 U.S.C. 154(b) by 0 days.

(21) Appl. No.: 08/247,518

(22) Filed: May 23, 1994

Related U.S. Application Data

(63) Continuation of application No. 07/895,525, filed on Jun. 2, 1992, now abandoned.

(51) Int. Cl.[7] .......... C03B 29/00; C04B 37/00

(52) U.S. Cl. .......... 156/89.11; 156/89.23; 264/633; 264/645

(58) Field of Search .......... 156/89, 89.11, 156/89.23; 264/56, 63, 297.9, 297.2, 328.2, 328.9, 328.18, 633, 645

(56) References Cited

U.S. PATENT DOCUMENTS

| | | | | |
|---|---|---|---|---|
| 1,677,611 | | 7/1928 | Bailey | 249/58 |
| 1,885,303 | | 11/1932 | Slick | 249/58 |
| 2,434,271 | * | 1/1948 | Howatt | 264/328.2 |
| 2,583,951 | * | 1/1952 | Kliegel | 215/1 R |
| 2,839,209 | | 6/1958 | Lester | 215/13 |
| 3,357,056 | | 12/1967 | Reyburn | 249/58 |
| 3,499,569 | | 3/1970 | Wentzel | 215/99.5 |
| 3,889,071 | * | 6/1975 | Davis et al. | 379/455 |
| 4,156,051 | * | 5/1979 | Nakamura et al. | 156/89 |
| 4,220,079 | * | 9/1980 | Sims | 215/1 R |
| 4,533,311 | | 8/1985 | von Karchowski | 425/405 H |
| 4,597,926 | * | 7/1986 | Ando et al. | 264/645 |
| 4,713,204 | * | 12/1987 | Jung | 264/120 |
| 4,713,206 | * | 12/1987 | Matsuhisa et al. | 264/67 |
| 4,908,172 | * | 3/1990 | Sterzel et al. | 264/328.2 |
| 5,250,251 | * | 10/1993 | Fanelli et al. | 264/328.2 |

FOREIGN PATENT DOCUMENTS

| | | |
|---|---|---|
| 320133 | 4/1920 | (DE) . |
| 3038591 | 5/1982 | (DE) . |
| 0345022 | 6/1989 | (EP) . |
| 693901 | 11/1930 | (FR) . |
| 38776 | 7/1931 | (FR) . |
| 2601287 | 1/1988 | (FR) . |

* cited by examiner

*Primary Examiner*—Christopher A. Fiorilla
(74) *Attorney, Agent, or Firm*—Amster, Rothstein & Ebenstein

(57) ABSTRACT

An injection molded ceramic cup, such as a teacup, includes a body and a handle. The body and handle together are an integral, one-piece, unitary construction formed of ceramic and a binder in a single injection molding operation. Additionally, an injection molded article, such as a ceramic cup, has a concealed sprue and includes an injection molded article body having an outer surface defining a recess and a sprue (whether negative or positive) terminating in the recess. A plug is disposed in the recess for concealing the sprue, the plug being molded separate and distinct from the article, having a first surface for concealing the sprue and a sidewall for substantially filling the recess, and being fired in situ with the article to secure the article and plug together.

9 Claims, 3 Drawing Sheets

FIG. 1
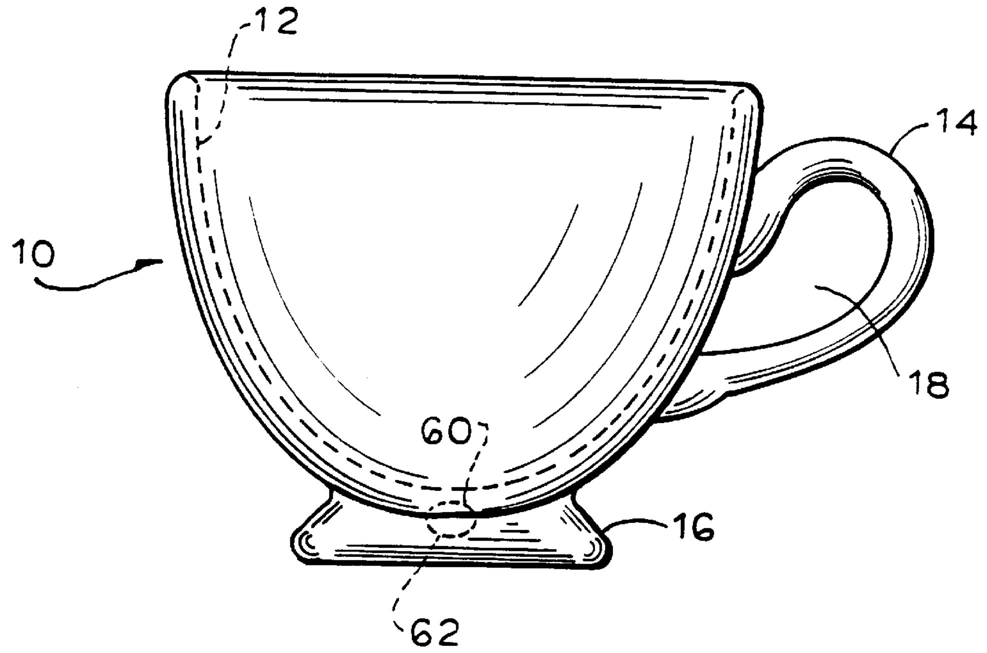
FIG. 3A
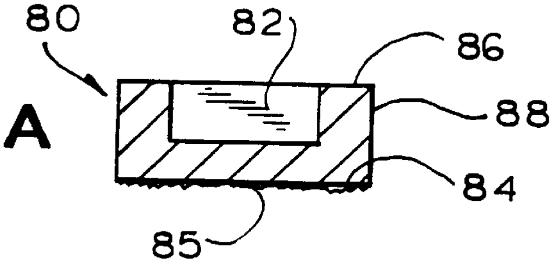
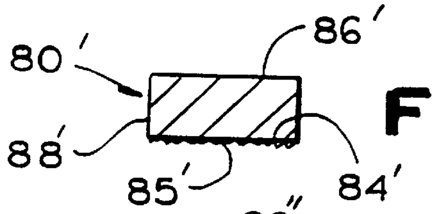
FIG. 3B
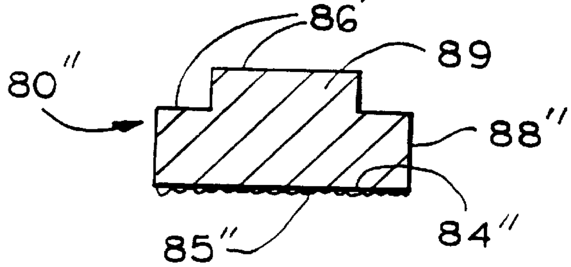
FIG. 3C

METHOD OF MAKING INJECTION MOLDED CERAMIC CUP

This is a continuation of application Ser. No. 07/895,525 filed Jun. 2, 1992 now abandoned.

BACKGROUND OF THE INVENTION

The present invention relates to ceramic cups having a body and a handle and to injection molded articles having sprues, and more particularly to an injection molded ceramic cup having an integral handle and an injection molded article having a concealed sprue.

Cups made of ceramic materials (such as bone china or earthenware) have been made without handles by a variety of different procedures, including injection molding. Where the cup includes both a body and a handle (like a tea cup or mug), the body and handle cooperatively define an aperture for passage therethrough of at least a portion of a user's finger. The term "cup" as used hereinafter will refer to a cup having a body and a handle.

Generally the prior art teaches the manufacture of ceramic cups by the separate manufacture of the body and the handle, and then the joining of the handle to the body in a cementing operation. As a result, the body/handle joint has always been a point of weakness in prior art cups, and the failure of the joint has resulted in many cups being discarded, both during the manufacturing process and during use by the consumer. Prior art manufacturing techniques also placed severe limitations on the design shapes which could be economically produced.

In order to avoid the difficulties associated with the after-formed body/handle joint, the art has relied upon a variety of different manufacturing techniques. U.S. Pat. No. 4,533,311 and U.S. Pat. No. 4,713,204 disclose the manufacture of a ceramic cup having an integral handle by an isostatic compression technique wherein the mold halves are somewhat spaced apart when the ceramic material is introduced into the mold and thereafter closed in order to produce the isostatic pressure. (By way of contrast, in an injection molding process, the mold halves are closed when the ceramic material is introduced into the mold, and the pressure is applied by the ceramic material itself being introduced into the closed mold or die cavity under pressure). U.S. Pat. No. 1,677,611 closes means for shaping a cup with an integral handle using a complex mold which requires a detachable portion in which the handle is formed. U.S. Pat. No. 1,885,303 discloses the formation of a cup in a mold which requires the use of pivotable levers in order to form the desired finger opening. U.S. Pat. No. 3,357,056 discloses the formation of a double-walled plastic cup with an integral handle through a compression molding.

These alternative manufacturing techniques are substantially more expensive and/or more burdensome than injection molding, especially where the mold must include detachable portions or movable elements within the die cavity. Additionally, these alternative processes fail to provide the distinctive distinguishing features of an injection molded process—for example, the ability to form thick and thin walls adjacent to one another, the ability to have sections of the cup (such as the design of the foot of the cup) pierced, and the ability to make unusual designs on the inside as well as the outside of the cup. For example, isostatic pressing present serious problems of die design and mold filling where thick and thin sections are to be formed adjacent to one another. By way of contrast, injection molding results in the ceramic material being uniformly distributed throughout the die cavity in the form of a flowable mass.

Any injection molded article, whether ceramic or not, will invariably have an unsightly irregularity or sprue at the point where the material to be molded has been injected into the mold, this point typically being referred to as "the entry point." The sprue at the entry point may be either "positive" (meaning that it extends outwardly from the adjacent surface) or "negative" (meaning that it represents a depression or cavity in the adjacent surface). A negative sprue may be formed either during the molding process or later when the manufacturer attempts to break off or otherwise remove a positive sprue. Regardless of whether the sprue is positive or negative, it typically detracts from the appearance of the finished article. Accordingly, the sprue is frequently formed in a relatively concealed portion of the article, such as the base or foot of a cup or plate. This does not completely solve the problem however, since a prospective purchaser will typically invert a cup or plate in order to note any indicia thereon which may indicate the manufacturer, the quality, or the like. Indeed, it is frequently precisely at the location of the sprue that the customer seeks the aforementioned indicia (e.g., a trademark, logo or quality indicator) and, instead or in addition, finds the unsightly sprue.

Accordingly, it is an object of the present invention to provide an injection molded ceramic cup wherein the body and handle are of integral, one-piece, unitary construction formed in a single injection molding operation.

Another object is to provide such a cup which affords one or more of the advantages of an injection molding manufacturing process.

A further object is to provide an injection molding process for the manufacture of such a cup.

It is also an object of the present invention to provide such an injection molded ceramic cup having a concealed sprue.

It is another object to provide an injection molded article (whether it be ceramic or not) having a concealed sprue.

It is a further object to provide such an article which appears to be custom made.

Yet another object of the present invention is to provide a process for manufacturing such an article.

SUMMARY OF THE INVENTION

It has now been found that some of the above and related objects of the present invention are obtained in an injection molded ceramic cup. The injection molded ceramic cup comprises a body and a handle, the body and handle together being an integral, one-piece, unitary construction formed of ceramic and a binder in a single injection molding operation.

In a preferred embodiment, the body and handle cooperatively define an aperture for passage therethrough of at least a portion of a user's finger, the body being substantially thinner than the handle. The construction is formed substantially of ceramic only. The ceramic is typically bone china or earthenware.

Optionally the body has an outer surface which at one point defines a recess and a sprue terminating in the recess, with separate and distinct plug means disposed in the recess for concealing the sprue.

The present invention additionally encompasses a process for the manufacture of such a cup. The process comprises the step of injection molding the body and the handle together in a single injection molding operation to form an integral, one-piece, unitary construction formed of ceramic and a binder therefor.

In a preferred embodiment, the cup is subsequently fired to remove the binder therefrom. The process typically includes the subsequent steps of cleaning the mold parting line on the cup, low temperature firing of the cup to remove a portion of the binder from the ceramic thereof, and high temperature firing and glazing of the cup.

Optionally the body is injection molded and has an outer surface defining a recess and a sprue terminating in the recess, and the process includes the additional steps of molding a plug separate and distinct from the cup, the plug having a first surface configured and dimensioned to conceal the sprue and a sidewall configured and dimensioned to substantially fill the recess. An assembly of the cup and the plug is formed by inserting the plug into the recess with the sprue being covered by the plug first surface, and the cup and the plug assembly is then fired to secure the cup and plug together.

The present invention further encompasses an injection molded article having a concealed sprue. The article comprises an injection molded article body having an outer surface defining a recess and a sprue terminating in the recess, and separate and distinct plug means disposed in the recess for concealing the sprue.

In a preferred embodiment, the plug has a pair of opposed surfaces and a sidewall connecting the surfaces, one of the opposed plug surfaces being configured and dimensioned to cover the sprue, and the plug sidewall being bonded to the recess by firing of the article body and the plug together. The other of the opposed plug surfaces is preferably customized to indicate the origin of the article or decoratively customized. The recess is disposed in the base of the article body and opens downwardly, and the one opposed plug surface is the upper surface thereof and the other of the opposed plug surfaces is the lower surface thereof. Where the sprue is a positive sprue projecting outwardly from the article body, the one plug surface is configured and dimensioned to receive the positive sprue; where the sprue is a negative sprue defining a recess in the article body, the one plug surface covers the sprue. In either case the recess snugly receives the plug prior to firing thereof together. The inner sidewall of the recess and the outer sidewall of the plug are preferably circular. The plug is preferably ceramic even if the article body is not ceramic.

Optionally the article is a ceramic cup having a body and a handle, the body having an outer surface defining the recess and the sprue, the body and handle together being an integral, one-piece unitary construction formed of ceramic and a binder in a single injection molding operation.

Finally, the present invention encompasses a process for manufacturing such an injection molded article having a concealed sprue. The process includes the steps of injection molding an article having an outer surface defining a recess and a sprue terminating in the recess, and molding a plug separate and distinct from the article, the plug having a first surface configured and dimensioned to conceal the sprue and a sidewall configured and dimensioned to substantially fill the recess. An article and plug assembly is formed by inserting the plug into the recess with the sprue being covered by the plug first surface, and then the article and plug assembly is fired to secure the article and the plug together.

In a preferred embodiment, a surface of the plug opposite the plug first surface is customized to indicate origin of the article prior to forming the article and plug assembly. The inner sidewall of the recess and the outer sidewall of the plug are configured and dimensioned for a snug fit.

Optionally the article is a ceramic cup having a body and a handle, the body having an outer surface defining the recess and the sprue, the body and handle together being an integral, one-piece, unitary construction formed of ceramic and a binder in a single injection molding operation.

BRIEF DESCRIPTION OF THE DRAWING

The above and related objects of the present invention will be more fully understood by reference to the following detailed description of the presently preferred, albeit illustrative, embodiments of the present invention when taken in conjunction with the accompanying drawing wherein:

FIG. 1 is a side elevational view of an injection molded ceramic cup according to the present invention;

FIGS. 3A, 3B and 3C are isometric views of different plugs suitable for use in concealing sprues.

DETAILED DESCRIPTION OF THE PREFERRED EMBODIMENTS

Figure 2A:
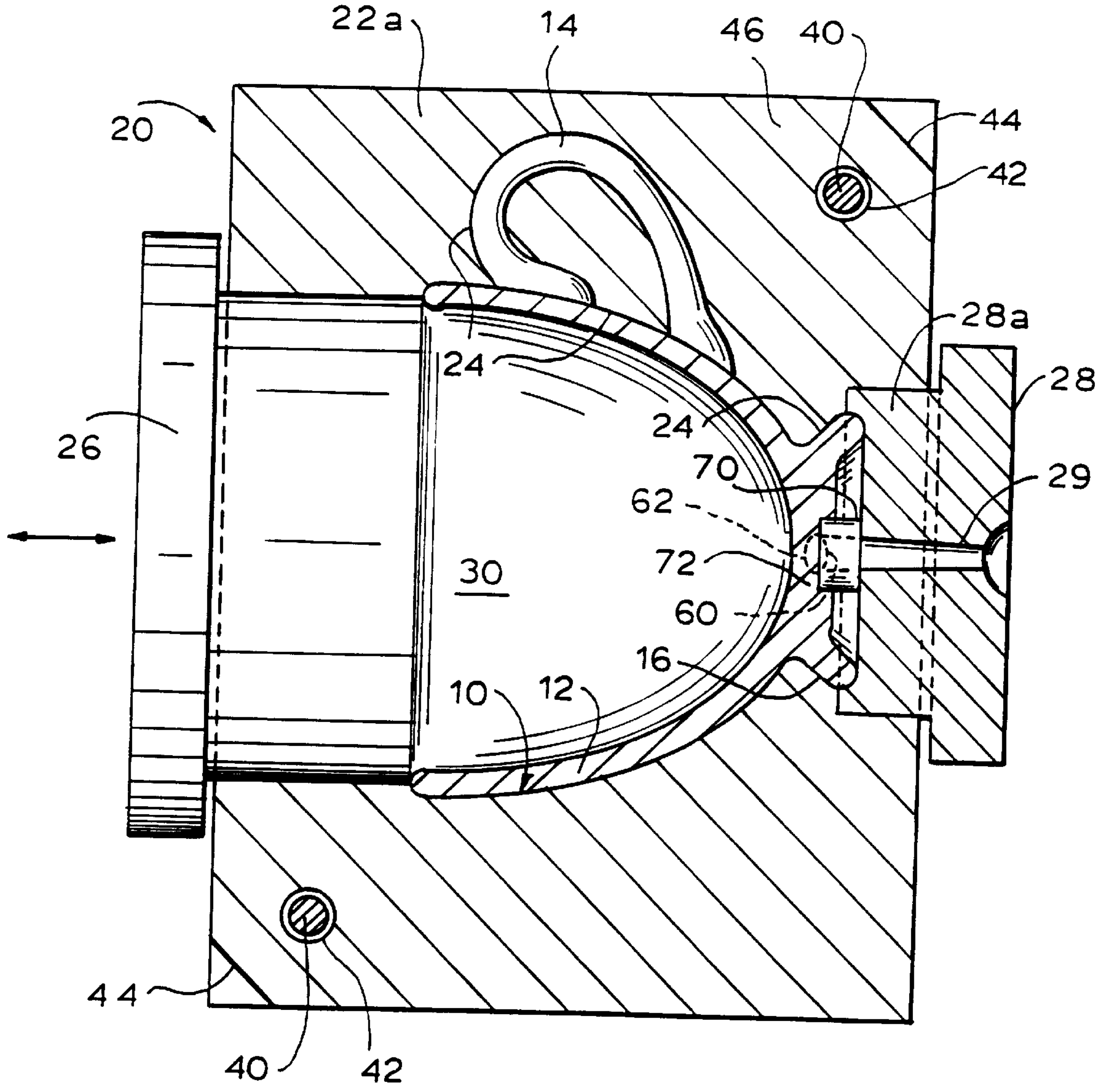
FIGS. 2A and 2B are top plan and side elevational views of an injection mold die for use in the process of manufacturing a ceramic cup according to the present invention.

Referring now to FIG. 1, therein illustrated is an injection molded ceramic cup according to the present invention, generally designated by the reference numeral 10. The cup 10 comprises a body 12 and a handle 14 and may be a mug, tea cup or the like. The body 12 typically includes a foot or base 16 which supports the cup 10 when it rests on a substrate. The body 12 and the handle 14 together are an integral, one-piece unitary construction formed of ceramic and a binder in a single injection molding operation. The body 12 and handle 14 cooperatively define an aperture 18 for passage therethrough of at least a portion of the user's finger. The body 12, at least above the level of foot 16, is preferably substantially thinner than the handle 14, the body 12 typically having a thickness less than 50% of the thickness of the handle 14. The ceramic is preferably bone china or earthenware, although other ceramics may also be used.

Referring now to FIG. 2, therein illustrated is an injection molding die of a type suitable for manufacture of the cup 10 according to the process of the present invention and generally designated 20. The mold or die 20 is adapted to be placed in a conventional injection molding machine wherein a heated injection molding mixture is forced under pressure into a cold die, the mixture becoming hard as it cools. After the mixture has hardened, it is removed from the die.

More particularly, the mold or die 20 comprises a first mold or die half 22_a_ and a second mold or die half 22_b_, the two halves 22_a_, 22_b_ having mating surfaces adjacent the periphery thereof so as to define opposed surfaces of a closed cavity 24 therebetween when the two die halves 22_a_, 22_b_ are in the closed position. The cavity 24 has one end thereof closed by a first plate 26, and the other end thereof closed by a second plate 28. A plug 30 configured and dimensioned to define the hollow of the cup body 12 is mounted on the first plate 26 for movement therewith and extends into the cavity 24. The plate/plug assembly 26/30 is movable between a molding position wherein the plug 30 is disposed at least partially within the die 20 so as to define the interior or hollow of the cup body 12, and a withdrawn position (not illustrated) wherein the plug 30 is totally withdrawn from the cup body 12 so as to enable removal of the cup 10 from the die cavity 24 when the die halves 22*a*, 22*b* are in the open position.

The second plate 28, which may be either stationary or movable, defines a small channel, gate, or sprue aperture 29 therethrough to enable the introduction of the injection molding mixture into the cavity 24. It will be appreciated that the portion 28*a* of the second plate 28 which enters the cavity 24 typically assists in defining the cavity 24 in the area of the bottom of the cup foot or base 16.

The plug 30 and the second plate 28 are preferably formed of steel or a like hard metal, while the die halves 22*a* and 22*b* and the plate 26 may be formed of aluminum, steel or like materials.

In its conventional aspects, the mold die 20 includes pins 40 and bushings 42 of hard steel so as to guide reciprocating movement of at least one of the die halves 22*a*, 22*b* (if not both), pry slots 44 on an opposed pair of corners of the die 20 in order to facilitate separation of the mold halves 22*a*, 22*b*, and clamping means 46 for clamping the mold halves 22*a*, 22*b* together during the injection molding process.

The injection molding mixture is a generally homogeneous mixture of a ceramic material and a thermoplastic binder. The ceramic material is selected to provide the ultimate composition of the cup and, as earlier noted, is preferably earthenware, bone china, or the like. The thermoplastic binder is organic, typically consisting primarily of paraffin or like wax (i.e., a vaporizable organic material) and a plasticizer (such as stearic acid). The ceramic powder comprises small amounts of a finely ground powder having a mesh below 200, and preferably below 600. Typically, the ceramic powder may include porcelain-forming type materials containing silica, a nephelene syenite, flint and various clays.

More particularly, the injection molding mixture to produce bone china may be prepared as follows:

The molten organic binders are weighed out and placed into a planetary mixer which has been pre-heated to 152° F. A specific quantity of the bone china raw materials is weighed out and then divided into three to five aliquots by weight. In specific time increments, the aliquots of the raw material are added to the binders and mixed in. At the end of each time period, an additional aliquot of raw material is added until all of the solids are combined with the binders.

At this time, the "mix" is processed by the mixer for a specific time interval which is determined by the volume of the mixer.

When the mix has been processed, it is removed from the mixing equipment and transferred to an injection press. At this time, the die is placed between the platens of the press and the platens closed to allow the die to come to equilibrium with the platen temperature. The temperature parameters must be pre-set at the press in order to allow this equipment to reach equilibrium prior to the attempt at molding.

A typical set of parameters for molding a cup of bone china are as follows:

| | |
|---|---|
| Injection pressure: | 380 PSI |
| Injection clamp pressure: | 460 PSI (about 8 tons) |
| Platen Temperatures: | |
| Top: | 80° F. |
| Bottom: | 80° F. |
| Injection Time: | 32 Sec. |
| Dwell Time: | 70 Sec. |

-continued

| | |
|---|---|
| Reservoir Temperature: | 195° F. |
| Cylinder Temperature: | 195° F. |
| Nozzle Temperature: | 195° F. |

When equilibrium is reached, the mix is drawn down into the cylinder from the reservoir. This "drawn down" cycle must be slow enough to avoid the "air" or "bubble" type of effect. When the cylinder is full, the cycle buttons of the press are pushed and the platens close. The press forces mix from the cylinder through the nozzle and the sprue gate 29 of the plate 28 into the die cavity 24. The injection cycle ends after the specified injection time period, and the dwell time then begins and continues for the remainder of the set cycle time (i.e., the injection time plus the dwell time). Once the dwell is complete, the platens open. Along with them, the die is separated thereby exposing a "green" part—i.e., the "green" cup). This part is removed from the die cavity and placed aside, and the cycle is then repeated.

Next, the "green" part is "denubbed" in order to at least partially remove a portion of any positive sprue formed by the solidifying mix within the sprue gate 29. Additionally, the "green" part may be processed to finish or remove the parting line (resulting from the juncture of the two mold halves 22*a*, 22*b*), either by automatic or manual methods. Alternatively, nubbing and parting line finishing may be postponed until after firing to remove the binder.

When the "denubbing" and finishing (if performed here) is completed, the "green" part is sent into a packaging and dumping area, where it is either placed into a ceramic container with a powdery media placed around it for support or into a preformed "setter" arrangement for support during firing.

The "green" part is then subjected to a binder removal process which utilities heat to fume and wick off the organic binder materials. During this cycle, the temperature of the "green" part is raised 25° F./hr to 450° F. and held there for 0.2 hours. In this manner, a specific percentage of the binder present in the "green" part is removed. It is not the object of this cycle to totally remove the binder organics, rather the intent is to leave a percentage of the binder organics in the part to add structural support thereto during the subsequent process steps.

The next step is to remove all evidence of packing media and/or bits of the setter prior to moving the parts for high fire maturation. After this surface "cleaning," the part, now ready for high firing, is placed into a refractory support and moved into the high temperature firing equipment or kiln.

The high temperature firing cycles are as follows:

For Conventional Bone China

166° F. Start

176° F./Hr. to 1382° F.

248° F./Hr. to 2030° F.

104° F./Hr. to 2174° F.

86° F./Hr. to 2282° F.

Hold 3 hrs.@2282° F.

572° F./Hr. to RT

End

OR

For Fast Fire Bone China

166° F. Start

482° F./Hr. to 482° F.

1022° F./Hr. to 1472° F.

2552° F./Hr. to 2102° F.

616° F/Hr. to 2248° F.

Hold 2.5 hrs.@2248° F.

572° F./Hr. to RT

End

This high temperature firing fully matures the part, which is then termed "bisque ware." At this point, the part is removed from the kiln, placed on material handling equipment, and moved to the inspection area where it will be visually inspected, candled, and either approved or rejected. If accepted, it is sent to shipping; if rejected, it is crushed and discarded.

The resulting cup 10 is characterized by the body and handle together being an integral, one-piece, unitary construction formed of ceramic and a binder in a single injection molding operation. The major portion of the binder is, of course, removed thereafter during the low and high temperature firings of the cup, so that the final cup is composed substantially of ceramic only (i.e., at least 98% ceramic by weight).

It will be appreciated that the process steps and parameters stated hereinabove are suitable for the creation of a cup according to the present invention made of bone china, but that the process steps and parameters may be varied widely without departing from the principles of the present invention. Additionally, the process steps and parameters may be varied further where cups of ceramic materials other than fine china are to be made. By way of example, different raw materials for the ceramic and different binder materials for the binder may be used, the molding parameters may be varied, and both the low temperature and high temperature firing parameters may be varied.

It will be appreciated that while a particular design or configuration for a cup is illustrated in the drawing, other conventional designs or configurations for a cup may be used alternatively, provided only that they are amenable to manufacture by an injection molding process according to the present invention.

As is well known to those skilled in the injection molding arts, the injection molding process typically leaves a spruce on the article (whether it be a cup or some other article) regardless of its composition. The sprue may be a positive sprue 60, as indicated in solid line, or a negative sprue 62, as indicated in phantom line. After the article 10 is removed from the injection mold die cavity 24, a positive sprue 60 is typically "denubbed" to reduce its size or even in particular applications to convert it into a negative sprue 62. Because the sprue, whether positive or negative, is unsightly, it is typically disposed on a relatively inconspicuous portion of the article—for example, as illustrated, on the bottom, within the base or foot 16 of a cup. In other instances, however, the optimum operation of the injection molding process requires that the sprue gate be disposed in a more conspicuous location. Accordingly, the present invention further encompasses an injection molded article (whether it be a cup or other article, and whether it be formed of ceramic or other material) having a concealed sprue.

Figure 2B:
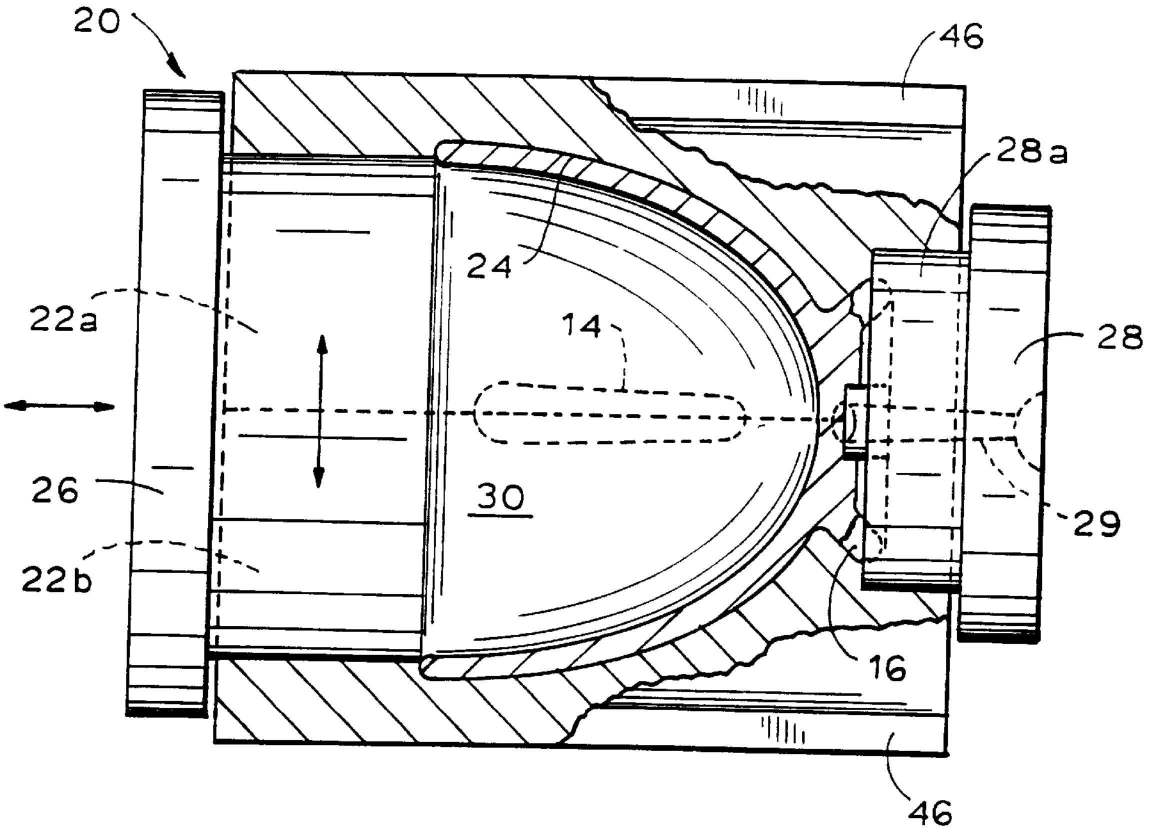

Referring now to FIGS. 2A and 2B, the cup base or foot 16 defines a recess 70 disposed about the positive sprue 60. It will be appreciated that where the sprue is a negative sprue 62, as illustrated in phantom line, the article surface about the negative sprue 62 automatically defines a recess 72 wherein the sprue 62 terminates. Thus, regardless of whether the sprue is positive or negative, the outer surface of an injection molded article 10 according to the present invention defines a recess 70, 72 and a sprue 60, 62 terminating therein. Even where the sprue is negative, it is preferred to form a recess 70, in addition to the recess 72, in order to provide the recess with an extended sidewall surface area, for reasons which will become apparent hereinafter. The recess 70 is formed during the injection molding process by appropriate configuration of the mold halves 22*a*, 22*b* and/or the second plate portion 28*a*.

Referring now to FIG. 3A, therein illustrated is a first embodiment of a plug according to the present invention, generally designated 80, suitable for use in concealing a sprue, whether it be a positive sprue 60 or a negative sprue 62. The plug 80 is U-shaped and defines an open-topped cavity 82 which is configured and dimensioned to receive therein the positive sprue 60, if present. More particularly, the plug 80 includes a pair of opposed surfaces 84, 86 and a sidewall 88 connecting the opposed surfaces. The upper plug surface 86 is configured and dimensioned to cover the sprue and to receive therein an outwardly projecting portion of a positive sprue 60.

Referring now to FIG. 3B, therein illustrated is a second embodiment 80' especially suited for use in concealing a negative sprue 62. Like the plug 80, the plug 80' includes a pair of opposed surfaces 84', 86' and a sidewall 88' connection the opposed surfaces 84', 86'. There is, however, no counterpart or analog to the recess 82 of plug 80. The plug 80' is smaller than plug 80, being configured and dimensioned to be substantially completely received within the recess 72 about the negative sprue 62, preferably without extending greatly outwardly beyond the recess 72.

Referring now to FIG. 3C, therein illustrated is a third embodiment 80" especially suited for use in concealing a negative sprue 62. The plug 80" has a pair of opposed surfaces 84", 86" and a sidewall 88" connecting the opposed surfaces 84", 86". The surface 86" defines an outwardly (i.e., upwardly) extending step 89 in the center thereof. The step 90 is configured and dimensioned to be at least partially received within the recess 72 about the negative sprue 62, while the remainder of the plug 80" is adapted to be at least partially received within the typically larger recess 70 (although the surface 84" may extend outwardly from the recess 70).

It will be appreciated that the recesses 70, 72, while typically circular, may be square or of any other desired configuration, with the sidewall 88, 88', 88" of the plug to be used therein being similarly configured. The plug is configured to be snugly received within the recess 70, 72 or 70/72. In other words, the plug 80 would be snugly received within the recess 70, the plug 80' would be snugly received within the recess 72, and the plug 80" would have its step 89 snugly received within the recess 72 and the remainder of the plug 80" snugly received within the recess 70.

Regardless of the composition of the article body (which need not be ceramic), the plug is preferably formed of ceramic material, whether alone or with an organic binder. The plug may itself be injection molded, possibly even within the same injection molding equipment used to manufacture the cup 10, or otherwise manufactured separate and distinct from the article 10. Preferably, any sprue formed during injection 10 molding of the plug is formed on the upper surface 86, 86', 86", which will be hidden within the recess, rather than on the lower surface 84, 84', 84", which typically will be exposed for viewing. For example, where the article is a cup 10 and the sprue 60, 62 is formed in the base 14 thereof, the cup recess 70, 72 opens downwardly and the plug surface 86, 86', 86" faces upwardly as the plug is snugly inserted within the recess.

In any case, once the plug has been inserted into the article recess, the plug sidewall 88, 88', 88" is bonded to the recess sidewall 70, 72, 70/72 by firing of the article body and the plug together—that is, with the plug in situ. Where both the article and the plug contain a high level of organic binders, the plug is preferably inserted into the article recess prior to low temperature firing of the article/plug assembly. Alternatively, where the plug initially contains a high level of binders, it may be low temperature fired by itself and then inserted into the recess of an unfired or low temperature fired article, so that the article/plug assembly undergoes high temperature firing as a unit. Where both the article and the plug initially have only low levels of binders, or no binders, so that only one firing is required, the plug is inserted into the article recess prior to such firing so that the firing binds the article body and plug together. Generally, it is preferred to insert the plug within the article recess prior to any firing so that the article is both cool to the touch and possessed of a high level of strength during the insertion process.

Figure 4A:
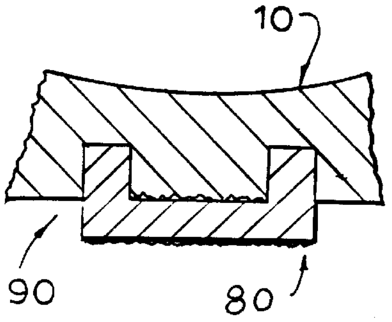
FIGS. 4A, 4B and 4C are sectional views of cups having sprues concealed according to the present invention with the plugs of FIGS. 3A, 3B and 3C respectively.
Figure 4B:
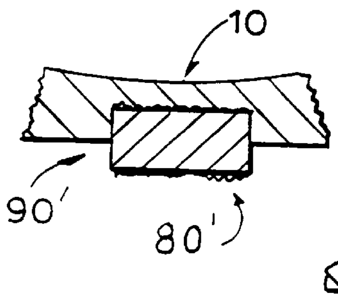
Figure 4C:
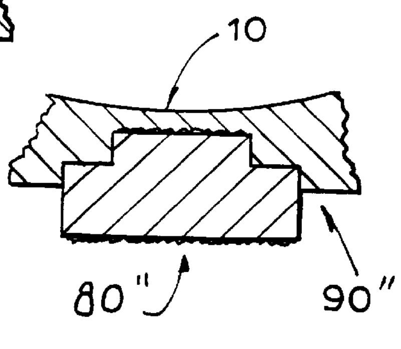

FIGS. 4A, 4B and 4C illustrate cups 10 according to the present invention which have been fired with plugs 80, 80', and 80", respectively, in order to conceal the sprues 60, 62 and 62 thereof, respectively, and define cups 90, 90' and 90" respectively. Generally, it suffices that the sidewalls 88, 88', 88" of the plug are in contact with and become bonded to the sidewalls of the recesses 70, 72, 70/72 during firing in situ. Where the plug 80" is used, both the sidewall of the step 89 and the sidewall of the remainder of the plug 80" are preferably fixed to the sidewalls of the recess 72 and the recess 70, respectively, during firing although it suffices that the sidewalls of either the step 90 or the remainder of the body become fixed to the sidewalls of the recess 72 or 70, respectively. Indeed, it is not even necessary that all of the plug sidewall become bonded to all of the recess sidewall, as the modest tendency of the plug to fall out of the recess during use may be overcome by even a modest amount of joinder of the two during firing.

Regardless of the process by which the plug is created, the surface 84, 84', 84" thereof (which would be exposed in the final article) is available for customizing of the article through the use of indicia (preferably molded-in) presenting a decorative design, a trademark or logo indicating the origin of the article, a quality indicator or the like. The term "customized" is purposefully employed because a plurality of plugs may be manufactured with different indicia, and these plugs selectively applied to various groups of a mass-produced article. Nonetheless, because the plug 80, 80', 80" appears to be an original and integral part of the article, it appears as if the article was manufactured exclusively for the customer who selected or is indicated by the customizing indicia 85, 85', 85", respectively. Accordingly, an article generally designated 90, 90', 90" incorporating a plug 80, 80', 80" according to the present invention not only has its sprue concealed, but also presents a customized appearance which can lend "custom made" value to the article. Thus, the plug may be used even when there is no sprue to conceal, e.g., when the sprue was removed during nubbing.

If desired, the bottom surface 84, 84' or 84" may extend radially outwardly slightly beyond the sidewall 88, 88', 88" to conceal from view the juncture of the sidewall of the plug and the sidewall of the recess.

To summarize, the present invention provides an injection molded ceramic cup wherein the body and handle are integral, one-piece, unitary construction formed in a single injection molding operation, the cup affording one or more of the advantages of an injection molding manufacturing process. The present invention also provides an injection molded article having a separate and distinct plug concealing the sprue and, if desired, providing a custom-made appearance to the article. The present invention further provides a process for the manufacture of such a cup and article.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims, and not by the foregoing specification.

I claim:

1. A process for making a ceramic cup having a body and a handle, comprising the steps of (A) injection molding the body and the handle together in a single injection molding operation to form an integral, one-piece, unitary construction formed of ceramic and a binder therefor, the body having an outer surface defining a recess and a sprue terminating in the recess;

(B) molding a plug separate and distinct from the cup, the plug having a first surface configured and dimensioned to substantially fill the recess;

(C) forming an assembly of the cup and the plug by inserting the plug into the recess with the sprue being covered by the plug first surface; and (D) firing the cup and plug assembly to secure the cup and plug together.

2. A process for manufacturing an injection molded article having a concealed sprue, comprising the steps of:

(A) injection molding a ceramic article having an outer surface defining a recess and a sprue terminating in the recess;

(B) molding a ceramic plug separate and distinct from the article, the plug having a first surface configured and dimensioned to conceal the sprue and a sidewall configured and dimensioned to substantially fill the recess;

(C) forming an article and plug assembly by inserting the plug into the recess with the sprue being covered by the plug first surface; and (D) firing the article and plug assembly to secure the article and the plug together.

3. The process of claim 2 wherein a surface of the plug opposite the plug first surface is customized to indicate origin of the article prior to forming the article and plug assembly.

4. The process of claim 2 wherein the recess defines an inner sidewall, the plug defines an outer sidewall, and the inner sidewall of the recess and the outer sidewall of the plug are configured and dimensioned for a snug fit.

5. The process of claim 4 wherein the inner sidewall of the recess and the outer sidewall of the plug are circular.

6. The process of claim 2 wherein the recess is disposed on a bottom surface of the article and opens downwardly.

7. The process of claim 2 wherein the sprue is a positive sprue projecting outwardly from the article, and the plug first surface is configured and dimensioned to receive the sprue.

8. The process of claim 2 wherein the sprue is a negative sprue defining a hollow in the article, and the plug first surface covers said sprue.

9. A process for manufacturing an injection molded ceramic cup having a body, a handle, and a concealed sprue, comprising the steps of:

(A) injection molding a ceramic cup having a body and a handle, the body having an outer surface defining a recess and a sprue terminating in the recess, the body and handle together being an integral, one-piece, unitary construction formed of ceramic and a binder in a single injection molding operation;

(B) molding a plug separate and distinct from the cup, the plug having a first surface configured and dimensioned to conceal the sprue and a sidewall configured and dimensioned to substantially fill the recess;

(C) forming a cup and plug assembly by inserting the plug into the recess with the sprue being covered by the plug first surface; and (D) firing the cup and plug assembly to secure the cup and the plug together.

* * * * *